July 5, 1960  G. FRITZMEIER  2,943,884
ROOF AND WINDSHIELD ARRANGEMENT FOR VEHICLES
Filed Aug. 16, 1957  3 Sheets-Sheet 1

Inventor
Georg Fritzmeier
By Michael S. Stroke
Attorney

July 5, 1960   G. FRITZMEIER   2,943,884
ROOF AND WINDSHIELD ARRANGEMENT FOR VEHICLES
Filed Aug. 16, 1957   3 Sheets-Sheet 2
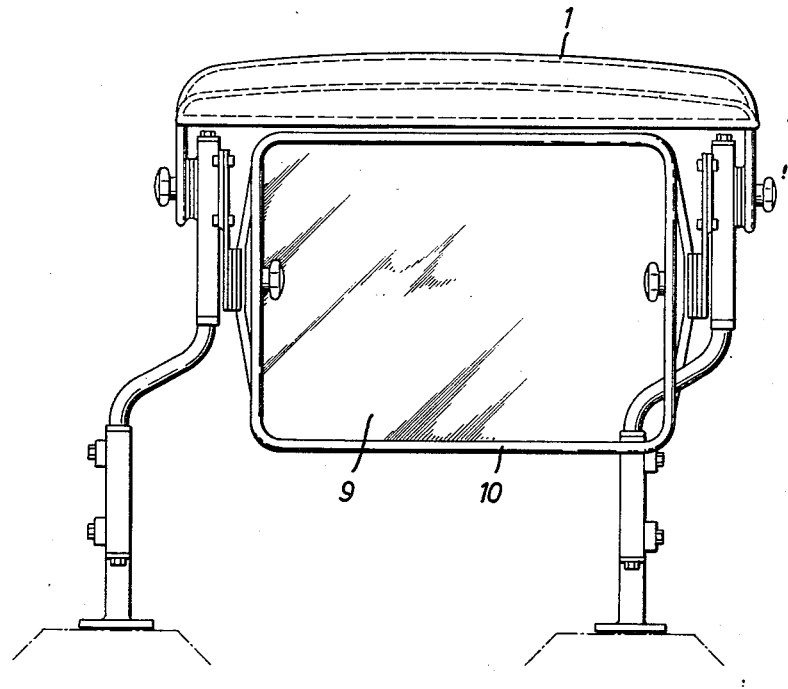
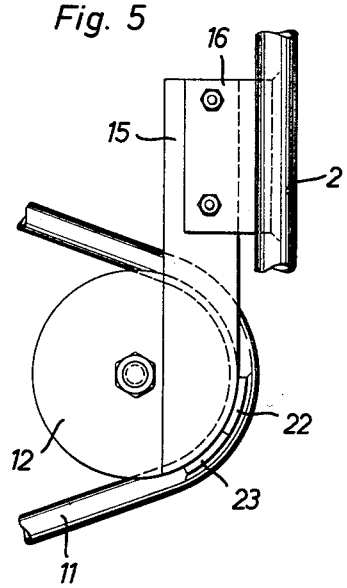
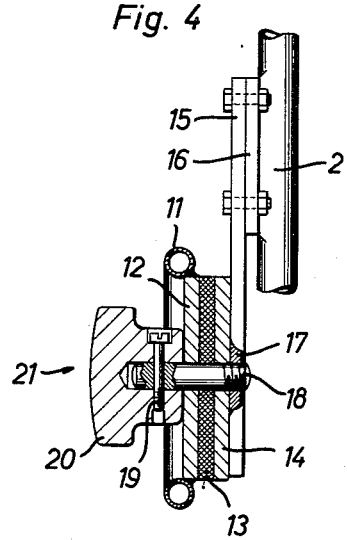
Inventor
Georg Fritzmeier
By Michael S. Striker
Attorney July 5, 1960  G. FRITZMEIER  2,943,884
ROOF AND WINDSHIELD ARRANGEMENT FOR VEHICLES
Filed Aug. 16, 1957  3 Sheets-Sheet 3

Inventor
Georg Fritzmeier
by
Michael S. Striker
Attorney

United States Patent Office 2,943,884
Patented July 5, 1960

2,943,884
ROOF AND WINDSHIELD ARRANGEMENT FOR VEHICLES

Georg Fritzmeier, House No. 14, Grosshelfendorf, near Munich, Germany

Filed Aug. 16, 1957, Ser. No. 678,634

Claims priority, application Germany Aug. 18, 1956

6 Claims. (Cl. 296—90)

The present invention relates to vehicles.

More particularly, the present invention relates to windshields and roofs of vehicles such as tractors and the like.

Depending upon operating conditions it is desirable to be able to place the roof and windshield of a vehicle such as a tractor in different positions. For example, when there is no wind or rain the windshield is not desired, but with conventional vehicles it is not feasible to remove the windshield during good weather. On the other hand, under some conditions as when the sun is shining, it is desirable to remove the windshield but still to retain the roof so that under these conditions removal of both the roof and the windshield is not desirable. On the other hand, with certain types of tractors the space behind the operator is taken up by hydraulic systems or other devices which extend to a considerable height so that it is desirable if the operator can get into the vehicle from the front of the same, and for this purpose it is desirable to have a roof and windshield which will permit such entry into the vehicle.

One of the objects of the present invention is to provide a vehicle of the above type with a means which will permit the windshield to be conveniently and easily moved between operating and inoperative positions.

Another object of the present invention is to provide a vehicle which permits the roof to be selectively positioned.

It is also an object of the present invention to provide a vehicle wherein the roof and windshield can be moved relative to each other without interfering with each other during their movement.

With the above objects in view the present invention includes in a vehicle a windshield and a means which supports the windshield for turning movement about a substantially horizontal axis between an operating position where the windshield is in a substantially vertical plane and in an inoperative position where the windshield is in a substantially horizontal plane over the operator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a front view of the structure of Fig. 1 showing the roof and windshield after they have been laterally shifted;

Fig. 4 is a sectional view taken along the line IV—IV of Fig. 2 in the direction of the arrows and showing structure for fixing the windshield in an adjusted position on an enlarged scale;

Fig. 5 is a side view of the structure of Fig. 4;

Figure 1:
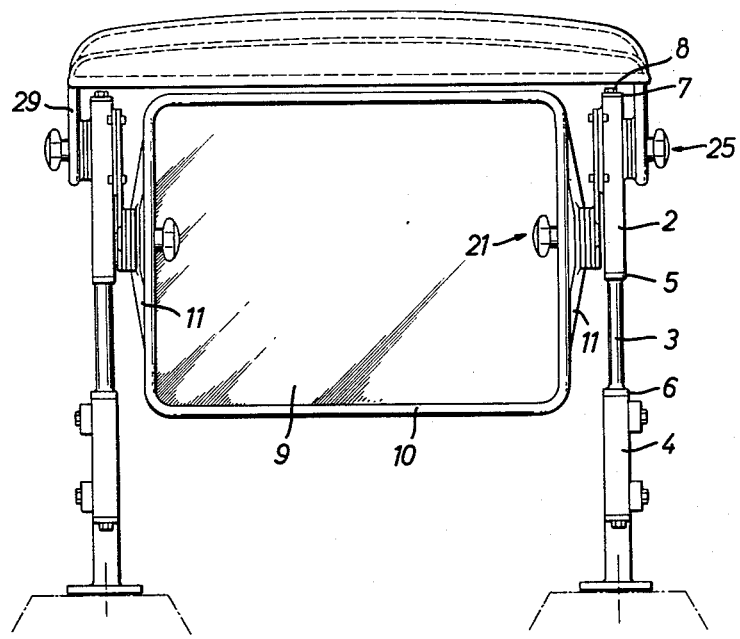
Fig. 1 is a front view of a roof and windshield arrangement according to the present invention, the roof and windshield being shown in their normal operating positions in Fig. 1.
Figure 7:
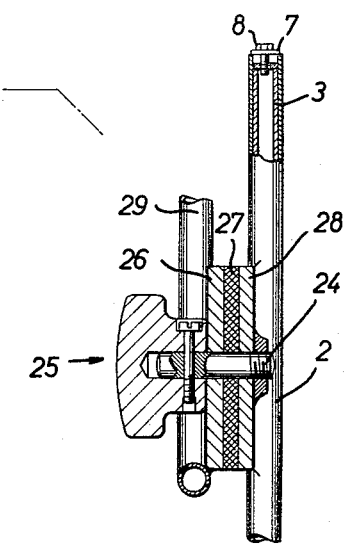
Fig. 7 is a sectional view taken along the line VII—VII of Fig. 2 in the direction of the arrows and showing on an enlarged scale structure for releasably fixing the roof in an adjusted position.

Referring now to the drawings, the roof 1 of the vehicle is carried by a pair of support means each of which is composed of three elongated members 2, 3 and 4 which extend into each other and which are turnable with respect to each other. The upper elongated member 2 of each support means is in the form of a hollow tube which receives an upper portion of the intermediate member 3 and which rests upon a collar 5 fixed to the intermediate member 3, and the intermediate member 3 in turn extends into the lower member 4 which is in the form of a hollow tube, and this intermediate member 3 fixedly carries a further collar 6 which rests on the top end of the lower member 4. As may be seen from Fig. 2 the intermediate member 3 of each support means has a cranked-shaped configuration so that with the construction the roof 1 may be laterally shifted by turning members 2 and 3 with respect to the members 4, respectively, and in Fig. 3 the roof is shown in a laterally shifted position to which it has been moved while remaining in the same horizontal plane. The particular position to which the roof has been shifted may be releasably fixed by screws 8 (Figs. 1 and 7) which extend through washers 7, respectively, carried by the top ends of the upper members 2 into threaded engagement with threaded bores of the members 3, so that upon tightening of the screws 8 the lateral position of the roof is fixed.

Figure 2:
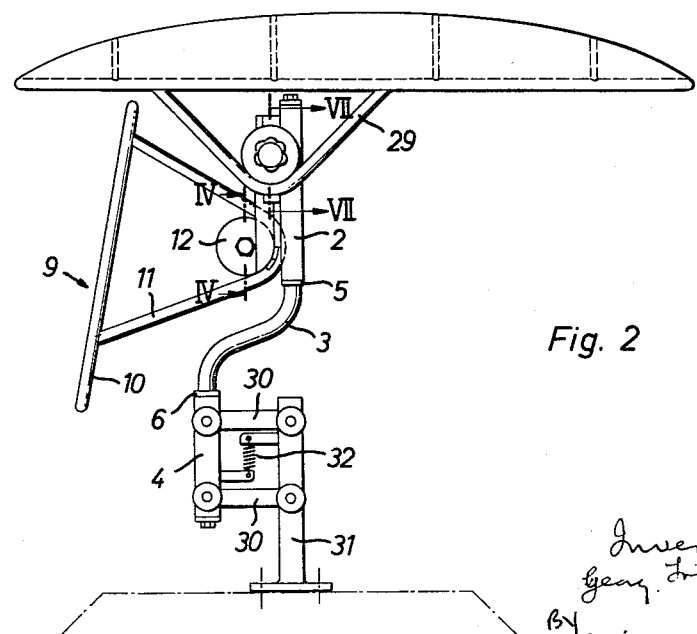
Fig. 2 is a side view of the structure of Fig. 1.

The windshield 9 is fixed at its opposite sides to a pair of arms 11 which respectively extend rearwardly from the windshield 9 when the latter is in its front operating position (Fig. 2). These arms 11 may be in the form of elongated tubular members which are angularly bent and which are welded at their free ends to the outer frame of the windshield. Within the angle formed by each bent arm 11 at a portion of the latter distant from the windshield 9 there is welded to each arm 11 or fixed in any other suitable manner thereto a disc 12 made of iron or the like and formed with a central opening, and as may be seen from Fig. 4 next to the disc 12 is located an elastic disc 13 made of rubber or the like and also formed with a central opening coaxial with the opening of the disc 12. Furthermore, another outer disc 14 of iron or the like formed with a central opening is located next to the face of the elastic disc 13 which is opposite from the disc 12, as is clearly shown in Fig. 4. The disc 14 is welded or otherwise fixed to an iron bar or the like 15 which is screwed to a flange 16 which is welded to and extends from each upper member 2 of the pair of support means 2—4. The bar 15 is non-centrally fixed to the disc 14. A nut 17 is coaxially fixed as by welding to the outer face of the disc 14, and if desired the nut 17 may be integrally formed with the disc 14. The elements 12—14 form part of a means supporting the windshield for turning movement about a substantially horizontal axis, and this means further includes a screw member 18 of a screw means 21 which serves to fix the windshield 9 in an adjusted angular position, the screw member 18 extending through the aligned openings of the discs 12—14 into threaded engagement with the nut 17. A screw 19 passes transversely through each screw member 18 and serves to fix the latter to a knob 20 so that when the latter is turned the screw 18 is turned. The pair of screws 18 are coaxial with each other and form the horizontal turning axis of the windshield whose angular position is fixed by actuation of the screw means 21, and the clamping of the elastic intermediate disc 13 between each pair of outer rigid discs 12 and 14 guarantees that the adjusted position of the windshield will be maintained without slipping and furthermore provides a yieldable, spring mounting for the windshield.

Figure 6:
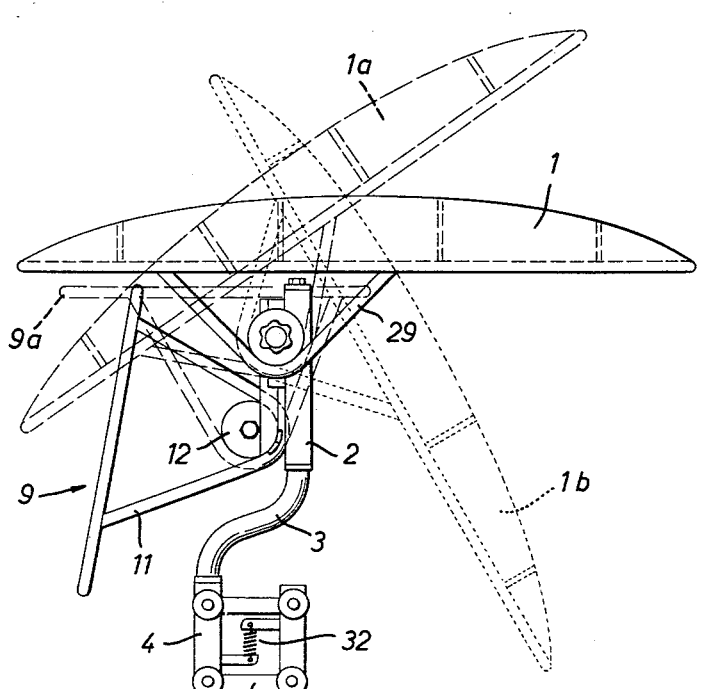
Fig. 6 shows the structure of Fig. 2 and illustrates various positions of the windshield and roof.

In Fig. 6 the windshield 9 is shown in solid lines in its operating position where it is located in a substantially vertical plane. If it is desired to turn the windshield 9 from its operating position to an inoperative position 9a where the windshield 9 is located in a substantially horizontal plane over the operator, then it is only necessary to loosen the pair of screw means 21 and turn the windshield 9 about the bolts 18 up to the inoperative position of the windshield 9 where, by tightening of the screw means 21, the windshield can be maintained in its inoperative position. It is also possible of course to releasably fix the windshield in any other adjusted position.

The downward turning movement of the windshield toward its operating position is limited by a stop means composed of a pair of stop members 22 and 23 respectively fixed to each bar 15 and arm 11, respectively, as indicated in Fig. 5. Thus, as the arms 11 turn with the windshield in a counterclockwise direction, as viewed in Fig. 5, during movement of the windshield toward its operative position, the stops 23 turn together with the arms 11, respectively, and these stops 23 respectively engage the stops 22 which are respectively fixed to the bars 15, the stops 22 and 23 being fixed to bar 15 and arm 11, respectively, by welding or the like.

The roof 1 is also supported by a suitable means for turning movement about a substantially horizontal axis and is also capable of being releasably fixed in a desired angular position. As may be seen from Fig. 7, the horizontal turning axis for the roof is provided by a pair of screw members 24 of a pair of screw means 25, respectively, which respectively correspond to the screw members 18 of the screw means 21. Also, in this case three discs 26, 27 and 28 provided with coaxial central openings are located next to each other with the outer discs 26 and 28 being made of a metal such as iron, and the intermediate disc 27 being made of an elastic material such as rubber, and the screw member 24 passes through the aligned openings of these discs. A disc 26 is fixed as by welding or the like to each arm 29, the arms 29 being similar to the arms 11 and extending from the sides of the roof frame, respectively, with the discs 26 being respectively fixed to the arms 29 at the angles formed by the bends therein. The other discs 28 of each set of discs are respectively fixed to the upper elongated members 2 of the pair of support means as by welding or the like, as is evident from Fig. 7. The elements 16 and 28 are fixed to different portions of each upper member 2.

As may be seen from Fig. 6, the roof 1 may be tilted with this structure between the position 1a and the position 1b according to the wishes of the operator depending upon the weather and such factors as the orientation of the sun.

The dimensions of the roof 1 and the windshield 9 as well as their arms 11 and 29, respectively, are so related to each other that the windshield can be turned to any desired position irrespective of the position of the roof without having its turning movement interfered with by the roof in any way.

As is shown in Figs. 2 and 6, the lower members 4 of each pair of support means respectively form components of a pair of parallelogram linkages each of which includes an arm 30 pivotally connected to the member 4 and an arm 31 parallel to the member 4 and carried directly by the frame of the vehicle. The pivot pins of the parallelogram linkages are provided with rubber sleeves and a coil spring 32 is fixed at its opposite ends to a pair of arms respectively fixed to and extending from the arms 4 and 31, as shown in Figs. 2 and 6, so that with this structure the parallelogram linkages have yieldable resilient properties and in this way serve to diminish the transfer of vibrations of the vehicle to the roof.

It will be understood that each of the elements described above, or two or more together, may also find a useful application in other types of vehicles differing from the types described above.

While the invention has been illustrated and described as embodied in a windshield and roof of a vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle, in combination, a roof; only two support means carrying said roof, each support means being composed of three elongated members extending into each other and being turnable with respect to each other, said three members including upper and lower members and an intermediate member between said upper and lower members and said intermediate member having the configuration of a crank and the crank portions on the intermediate members of said two support means extending respectively in the same direction so that said intermediate members provide for lateral shifting of the roof; and means connected to the upper members of both of said support means for supporting a windshield of the vehicle for turning movement about a horizontal axis.

2. In a vehicle, in combination, a roof; only two support means carrying said roof, each support means being composed of three elongated members extending into each other and being turnable with respect to each other, said three members including upper and lower members and an intermediate member between said upper and lower members and said intermediate member having the configuration of a crank and the crank portions on the intermediate members of said two support means extending respectively in the same direction so that said intermediate members provide for lateral shifting of the roof; means connected to the upper members of both of said support means for supporting a windshield of the vehicle for turning movement about a horizontal axis; and means connected also to said upper members of both of said support means for supporting said roof for turning movement about a substantially horizontal axis.

3. In a vehicle as recited in claim 2, said roof being connected by a pair of arms to said means supporting the roof for turning movement about a horizontal axis and said windshield being connected by a pair of arms to said means supporting the windshield for turning movement about a horizontal axis, and said roof in all of its angular positions permitting free turning of the windshield about its horizontal axis without at any time interfering with the turning of the windshield.

4. In a vehicle, in combination, a roof; only two support means carrying said roof; first arm means fixedly connected at one end thereof to said roof and pivotally connected at the other end thereof to said support means, respectively, for supporting said roof for turning movement about a first horizontal axis; a windshield; and second arm means fixedly connected at one end thereof to said windshield and pivotally connected at the other end thereof at a point below said pivot point of said first arm means to said support means, respectively, for supporting said windshield for turning movement about a second horizontal axis, said roof being adjustable from a position in which it extends forwardly over said windshield to a position entirely rearwardly therefrom, and said roof in all of its angular positions permitting free turning of the windshield about its horizontal axis without at any time interfering with the turning of the windshield.

5. In a vehicle, in combination, a roof; only two support means carrying said roof, each support means being composed of three elongated members extending into each other and being turnable with respect to each other, said three members including upper and lower members and an intermediate member between said upper and lower members, said intermediate having the configuration of a crank and the crank portions on the intermediate members of said two support means extending respectively in the same direction so that said intermediate members provide for lateral shifting of the roof; means connected to the upper members of both of said support means for supporting a windshield of the vehicle for turning movement about a horizontal axis; and means for resiliently mounting said lower members of said support means on the vehicle for movement in vertical direction relative to the vehicle so that vibrations of the vehicle are not transmitted to said roof and said windshield carried by said support means.

6. In a vehicle, in combination, a roof; only two support means carrying said roof, each support means being composed of three elongated members extending into each other and being turnable with respect to each other, said three members including upper and lower members and an intermediate member between said upper and lower members, said intermediate member having the configuration of a crank and the crank portions on the intermediate members of said two support means extending respectively in the same direction so that said intermediate members provide for lateral shifting of the roof; means connected to the upper members of both of said support means for supporting a windshield of the vehicle for turning movement about a horizontal axis; and means for resiliently mounting said lower members of said support means on the vehicle for movement in vertical direction relative to the vehicle so that vibrations of the vehicle are not transmitted to said roof and said windshield carried by said support means, said means comprising a pair of upright members mounted on the vehicle, a pair of arms for each of said upright members and extending substantially normal therefrom spaced from each other and being each hingedly connected at opposite ends thereof to said upright member and to the corresponding lower member of said support means, and spring means operatively connected to said upright and said lower member and tending to keep said arms in substantially horizontal position.

References Cited in the file of this patent

UNITED STATES PATENTS

| | | |
|---|---|---|
| 723,749 | Sprague | Mar. 24, 1903 |
| 1,031,020 | Murphy | July 2, 1912 |
| 1,074,774 | Collier | Oct. 7, 1913 |
| 1,348,598 | Stretch | Aug. 3, 1920 |
| 1,564,969 | Lloyd | Dec. 8, 1925 |
| 2,040,624 | Morrison | May 12, 1936 |
| 2,176,252 | Favata | Oct. 17, 1939 |
| 2,251,193 | La Belle | July 29, 1941 |
| 2,714,387 | Meldrum | Aug. 2, 1955 |

FOREIGN PATENTS

| | | |
|---|---|---|
| 1,109,804 | France | Oct. 5, 1955 |